United States Patent

Beinhaur et al.

[11] Patent Number: 5,879,610
[45] Date of Patent: Mar. 9, 1999

[54] METHOD OF MAKING AN ELECTRICAL CONNECTOR

[75] Inventors: Ernest Lloyd Beinhaur; William Edward McClusky, both of Harrisburg; Daryl Lynn Stoner, Rexmont, all of Pa.

[73] Assignee: The Whitaker Corporation, Wilmington, Del.

[21] Appl. No.: 880,059

[22] Filed: Jun. 20, 1997

Related U.S. Application Data

[63] Continuation of Ser. No. 480,425, Jun. 5, 1995, abandoned, which is a continuation of Ser. No. 148,012, Nov. 4, 1993, abandoned, which is a continuation of Ser. No. 674,279, Mar. 21, 1991, abandoned.

[51] Int. Cl.⁶ .......................... B29C 45/14; B29C 33/12
[52] U.S. Cl. ................... 264/274; 264/272.11; 264/295; 264/296; 29/874; 29/884
[58] Field of Search .......................... 264/272.11, 272.14, 264/274, 294, 295, 296, 272.15; 29/883, 884, 874

[56] References Cited

U.S. PATENT DOCUMENTS

| | | | |
|---|---|---|---|
| 3,207,832 | 9/1965 | Patti et al. | 264/274 |
| 3,522,575 | 8/1970 | Watson et al. | 339/89 |
| 3,552,575 | 1/1971 | Watson et al. | 339/89 |
| 3,696,321 | 10/1972 | Cooper, Jr. | 339/94 A |
| 4,280,747 | 7/1981 | Kinzler | 339/126 RS |
| 4,337,574 | 7/1982 | Hughes et al. | 29/883 |
| 4,445,736 | 5/1984 | Hopkins | 29/883 |
| 4,480,151 | 10/1984 | Dozier | 174/153 R |
| 4,650,271 | 3/1987 | Forney, Jr. et al. | 339/177 R |
| 4,769,908 | 9/1988 | Olsson | 29/883 |
| 4,913,673 | 4/1990 | Kobler | 439/736 |
| 5,074,039 | 12/1991 | Hillbish et al. | 29/883 |

OTHER PUBLICATIONS

AMP Catalog 73–187, "Box Contact Connectors", Aug./1989, pp. 1,2,57–59.
AMP Catalog 74–266, "AMP–Blade Two–Piece Printed Circuit Edge Connector", Apr./1990; pp. 1–6.
AMP Data Sheet 74–266, "AMP–Blade Two Piece Printed Circuit Edge Connector", pp. 1–2; Jun./1974.
Cinch Catalog C–50A, "Dura–Con Connectors" (date unknown) pp. 23–26; Cinch Connector Division, Labinal Components and Systems, Inc.

*Primary Examiner*—Angela Ortiz
*Attorney, Agent, or Firm*—Anton P. Ness; Mary K. Van Atten

[57] ABSTRACT

A method for making an electrical connector (10,170) formed by molding a plastic septum (50) transversely across an axially extending connector cavity (22) defined between the axial connector walls about the array of contacts (60) extending axially within the cavity (22) from one connector face to another. The contact sections (62) extending from the connector are initially straight prior to molding and are then subjected to a forming step to define right angles for example, with portions (66) of the contacts (60) embedded with the plastic septum (50) being of irregular cross-section to establish resistance to the stresses of such forming and maintain the sealed nature of the connector (10). The connector may comprise an integrally molded plastic housing (174) or a metal shell (20) with the plastic septum (50) molded therewithin such as about an inner flange (34) for sealing and retention.

12 Claims, 5 Drawing Sheets

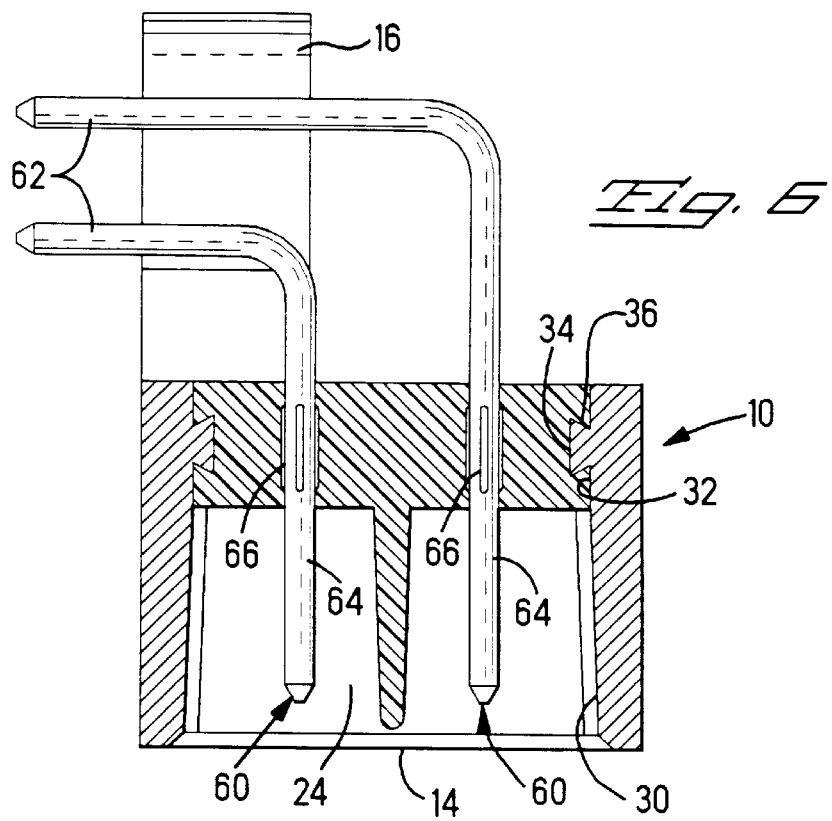
Fig. 6
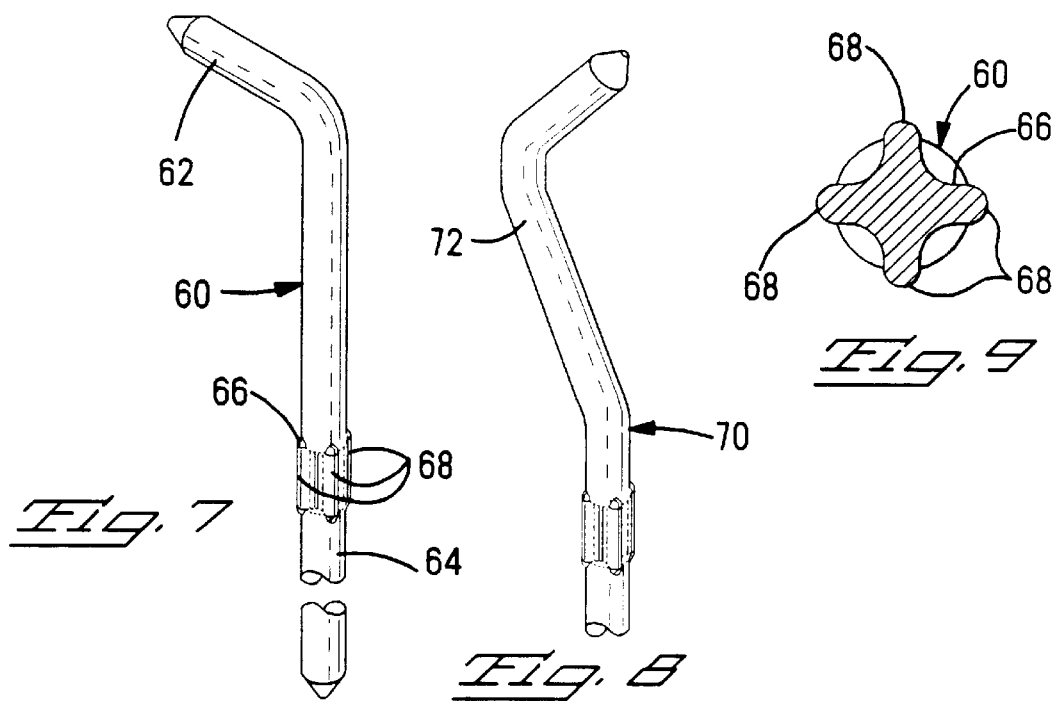
Fig. 7
Fig. 8
Fig. 9

METHOD OF MAKING AN ELECTRICAL CONNECTOR

This application is a Continuation of application Ser. No. 08/480,425 filed Jun. 5, 1995, now abandoned, which is a continuation of application Ser. No. 08/148,012 filed Nov. 4, 1993, now abandoned, which is a continuation of application Ser. No. 07/674,279 filed Mar. 21, 1991, now abandoned.

FIELD OF THE INVENTION

The present invention is directed to the field of electrical connectors and more particularly to a method of making a sealed electrical connector.

BACKGROUND OF THE INVENTION

Certain connectors are known having a molded plastic housing having an array of axial passageways into which are then inserted and retained respective electrical contacts. Where the connector is a pin header fabricated for later connection of the contacts to corresponding contact means of another electrical article such as circuit termini of a circuit board, it may also be important to provide sealing of the passageways about the contacts after insertion and retention by applying an amount of sealant material such as epoxy resin which will then be cured to close off the passageways; sealant application is usually a tedious skill sensitive manual operation even if circular preforms are used which are then melted and cured. For example, when the contacts are to be soldered to circuit termini of a circuit board, it would be desirable to prevent solder flux from wicking along the contacts through the connector to the opposed mating face; flux along the contacts would tend to cause corrosion and would remain after flux cleaning operations if within the plastic housing. Other materials such as conformal coating sprays of dielectric material similarly could wick along the contacts and interfere with assured electrical connections with contacts of a mating connector. One example of such a sealed pin header connector is sold by AMP Incorporated of Harrisburg, Penn. under Part No. 531122-5. It is desirable to provide a sealed pin header which is fabricated in an economical way.

Insert molding is generally known in the making of certain electrical connectors in which an array of contacts is held by tooling to extend into a mold cavity, and a plastic body is injection molded around body portions of the contacts intermediate opposed contact section ends, which then extend outwardly from two faces of the plastic body. One example of such a connector is sold by AMP Incorporated of Harrisburg, Penn. under the designation AMP-BLADE Connector, Part No. 582843 Series.

SUMMARY OF THE INVENTION

The present invention is a method of making an electrical connector having an array of contacts extending between first and second contact sections through a plate of plastic material, with the plate being a transverse portion of a plastic housing or is disposed within a metal shell. At least the second contact sections are arrayed along a mating face of the connector for mating with another electrical connector. The contacts are held by tooling in an axially disposed array, after which the array is positioned within a mold cavity of appropriate design for molding the plastic plate about intermediate or body portions of the contacts, in an insert molding process.

Prior to molding the contacts have at least their first contact sections initially essentially straight; after molding, at least the first contact sections are subjected to a forming step to deform the contact sections into a desired ultimate shape. In the method of the present invention it is preferred that the body portions of all of the contacts are deformed prior to molding to define an irregular cross-section, such as a four-lobed star, which will become embedded in the plastic plate and assure adhesion and improved retention of each contact within the plastic. The body portion deformation provides the necessary resistance to torque and other stresses during the post-molding forming step to assure that no incremental movement of the contacts occurs during forming and that the resulting array of contact sections is consistently even in shape and in contact position, and that the plastic plate remains sealed about the contact body portions for in-service use.

One example of contact section shape which is suitable for soldering, for example, to a corresponding array of plated through-holes of a circuit board, comprises the free ends of the first contact sections of the contacts of each row being bent at a right angle for mounting to the circuit board at a right angle to the mating axis of the connector. The first contact sections of the contacts of each row are of a length so that the bends of each row may be staggered so that the first contact sections of the multi-row array also define a multi-row array of contact sections extending essentially to a common plane and at right angles to the mating axis of the connector.

Another example of contact section shape for a two-row connector would be arcuate, where the contact sections of the contacts of one of the rows extend toward those of the other of the rows and then diverge, defining a constriction preceded by a lead-in for receipt of a card edge therebetween, termed "straddle mounting".

In one embodiment of connector, the housing is molded as one piece in the insert molding process.

In a second embodiment a metal shell is first machined or cast or otherwise manufactured and has a large axial aperture extending therethrough from one end to the other. The metal shell is then placed in a mold cavity which also is adapted to hold the array of contacts precisely positioned to extend through the metal shell at their final positions, and includes mold cavity wall portions which extend toward each other into the metal shell aperture from one end or both ends, closely adjacent the inner wall surfaces of the metal shell. Appropriate resin is then injected into the mold cavity which consists of the region between the facing surfaces of the wall portions within the metal shell and surrounded by the remaining portions of inner wall surfaces of the metal shell. To overcome the known shrinkage of plastic material following molding in order to assuredly secure the plastic septum within the shell and to maintain the seal from one end of the connector to the other, a profiled flange is provided on the shell prior to molding, extending inwardly from the inner wall surface of the shell at the axial position of the transverse plastic septum and completely peripherally therearound. The profiled flange may have a cross-sectional shape such as preferably a dovetail which defines undercuts into which the plastic material extends. After molding as the plastic cools, shrinkage of the plastic material within the undercuts establishes a mechanical grip along both sides of the flange peripherally around the inside of the shell for septum retention and simultaneously remains sealed against the flange. An integral seal is thus maintained through the connector from one face to the other between the plastic and the contacts and between the plastic and the shell.

It is an objective of the present invention to provide a connector that is sealed and that is also rugged.

It is an additional objective to provide an economical method of fabricating a connector.

It is also an objective of the present invention to provide an insert molded connector having contacts having initially straight outwardly extending contact sections which are subsequently formed after molding to extend at least at an angle to the remaining contact portions, where the connector remains sealed after such postmolding forming step.

Embodiments of the present invention will now be described by way of example with reference to the accompanying drawings.

BRIEF DESCRIPTION OF THE DRAWINGS

FIG. 6 is a cross-sectional view of the connector of FIG. 5 after forming the contact sections for right angle board mounting; and FIGS. 7 to 9 illustrate contacts of the type useful in the connector of the present invention which are round pins having contact sections which are formed at a right angle for right angle through-hole board mounting (FIG. 7) or which are formed into opposed arrays for engagement by board circuit termini at a leading edge of a card inserted therebetween (FIG. 8), both having center sections adapted for insert molding as shown in cross section in FIG. 9;

DETAILED DESCRIPTION OF THE PREFERRED EMBODIMENT

Figure 1:
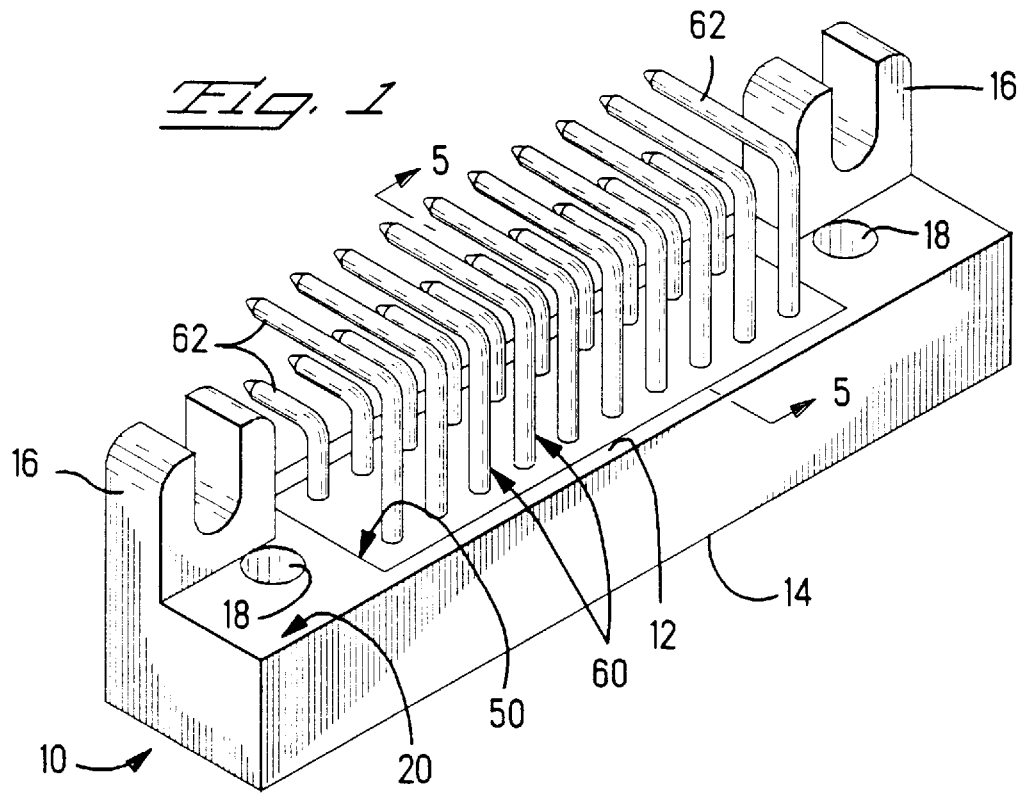
FIG. 1 is an isometric view of an electrical connector of the present invention.

Connector 10 of FIG. 1 has a mounting face 12 and an opposed mating face 14, and includes a metal shell 20, dielectric insert or septum 50 and an array of contacts 60 with first contact sections 62 extending from mounting face 12 and then at right angles. Connector 10 also is shown having a pair of flanges 16 adapted to facilitate connector 10 being secured at a right angle to a circuit board using fasteners (not shown). Apertures 18 would be useful in the mounting of key members (not shown) for keyed mating to a mating connector (not shown) along mating face 14.

Figure 2:
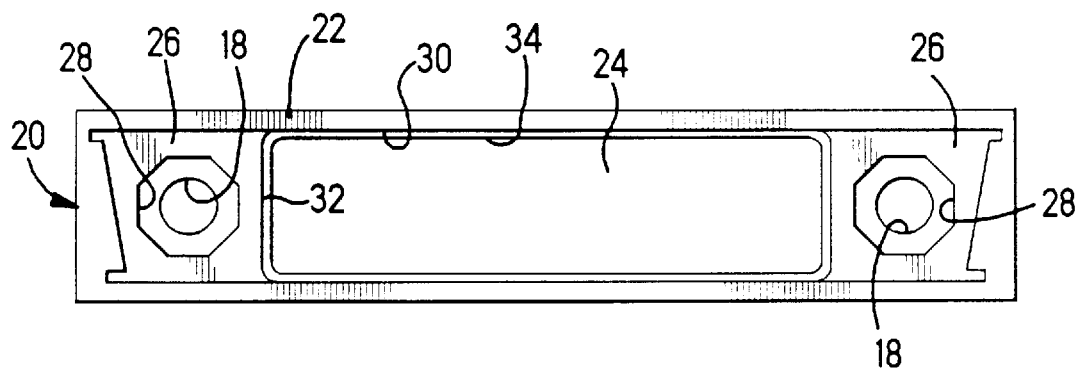
FIGS. 2, 3 and 4 are plan, elevation and cross-sectional views of the metal shell of the connector of FIG. 1 prior to molding.
Figure 3:
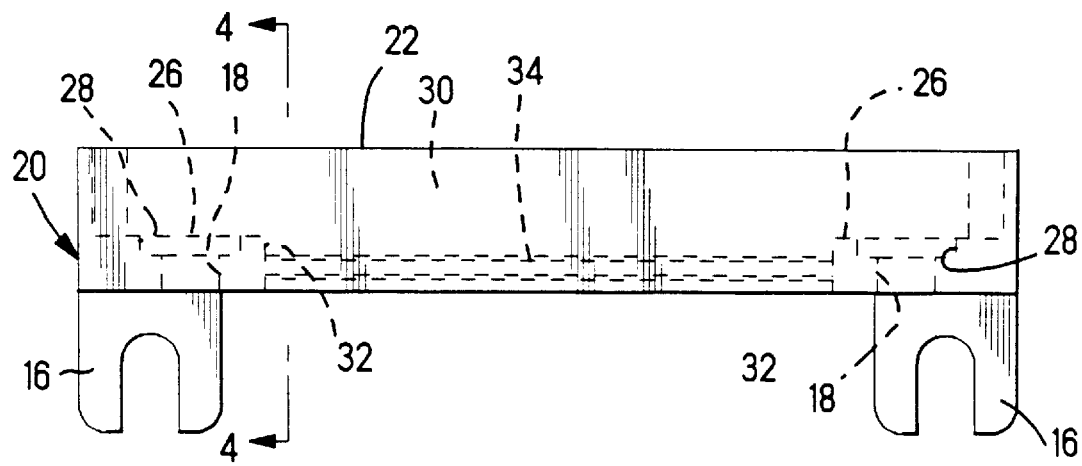
Figure 4:
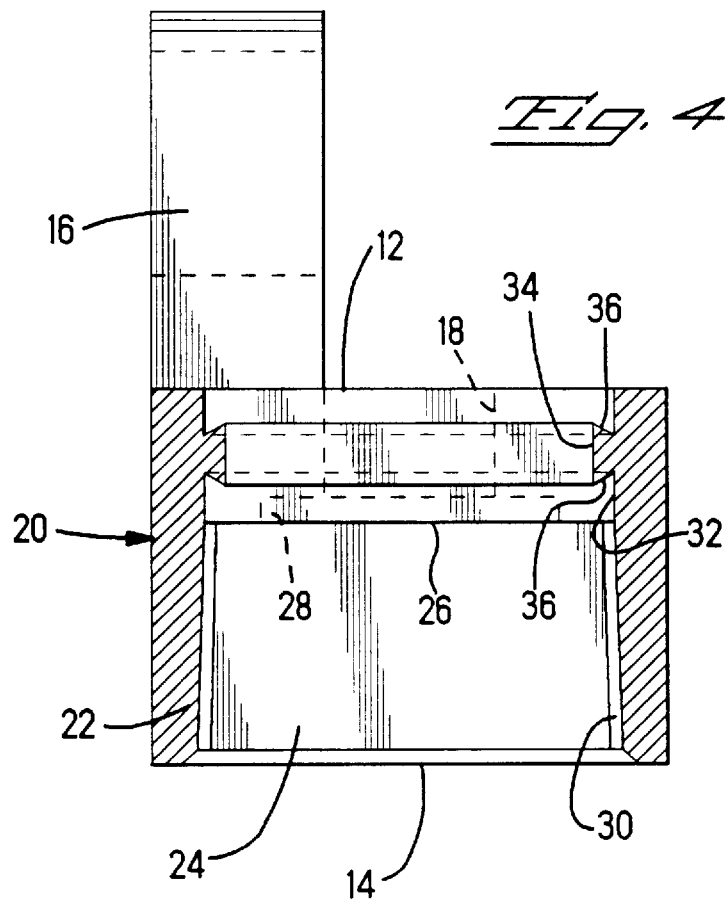

Connector 10 is fabricated in a manner disclosed in U.S. Pat. No. 5,108,317, and assigned to the assignee hereof. Metal shell 20 as seen in FIGS. 2 to 4 includes a hood section 22 having axially extending walls which extend to a leading edge at mating face 14 and define a large plug-receiving cavity 24 for eventual receipt of a plug portion of a mating connector during mating. At each end of cavity 24 preferably are lands 26 having shaped (such as octagonal) recesses 28 at leading ends of apertures 18 wherein correspondingly shaped portions of key members would be held at selected angular positions upon being mounted therein and then extend forwardly therefrom into cavity 24. Side walls of hood section 22 define inner surfaces 30 which generally extend axially through shell 20 and include a septum region 32 which will be the site ultimately of transverse plastic insert or septum 50 and past which body portions 66 of contacts 60 will eventually extend.

Septum region 32 is adapted to provide for inherent septum retention and sealing by means of flange 34 extending inwardly approximately centrally of the eventual plastic septum and extending peripherally around the entirety of septum region 32. Flange 34 preferably has a dovetail shape in cross-section with undercuts 36 formed along sides of the flange facing toward both mating face 14 and mounting face 12.

Figure 5:
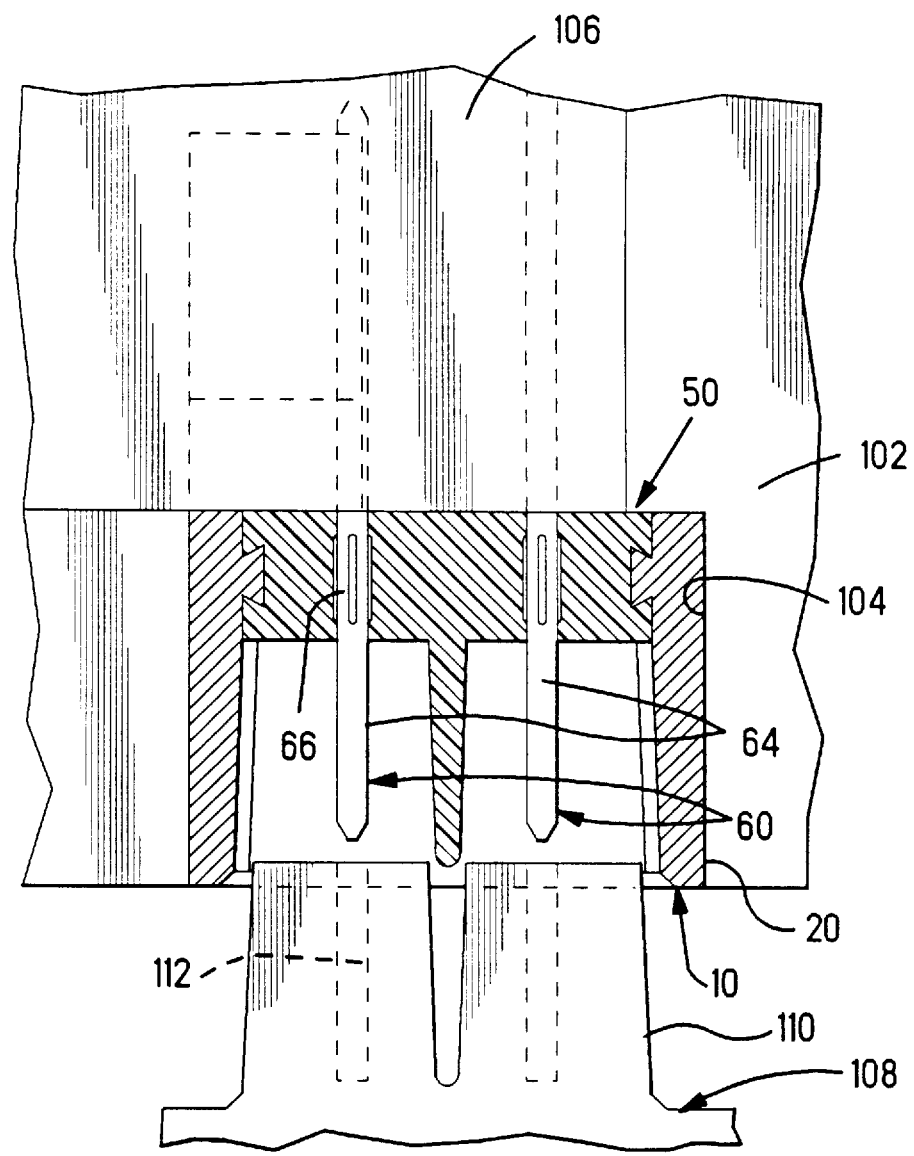
FIG. 5 is a cross-sectional view of the connector after molding of the plastic septum within the shell, showing the mold portions being parted for removal of the connector.

In FIG. 5, plastic septum 50 has been molded within shell 20 at septum region 34, using mold apparatus 100 in one exemplary method. First mold portion 102 includes a large cavity 104 within which had been disposed metal shell 20. Second mold portion 106 is of the type known conventionally to hold the array of contacts 60 in precise positions during the molding process and generally has a surface corresponding to the mounting face of the connector. Third mold portion 108 is adapted to be movable with respect to first mold portion 102 and has a plug portion 110 which is disposed within cavity 24 of shell 20 during the molding process and fits closely with respect to inner surfaces 30 of hood portion 22 of shell 20 and includes passageways 112 fitting closely about second contact sections 64 of contacts 60 which are straight pin sections, and mold portion 108 generally is located along the mating face of the connector. Preferably inner surfaces 30 have an incremental draft together with corresponding incremental drafts of wall surfaces of mold portion 110 thereby permitting withdrawal of mold portion 110 following molding of septum 50. Plastic resin could be injected through sprues in either mold portions 106 or 108 leading to mounting face 12 or the bottom of cavity 24, for example, or could be injected through several small holes (not shown) through shell wall 22 at septum region 32 which holes would remain filled with plastic after molding and would have a negligible effect on the rugged nature of the resulting connector.

Examination of FIG. 5 discloses that molded septum 50 transversely across cavity 24 at septum region 32 will cure to solidify about dovetail-shaped flange 34 and define a mechanical grip thereto which will disallow shrinkage away from the surfaces of the shell member 20, and thus will be retained securely against axial stress and strain as well as define a seal peripherally around septum region 32 of shell 20.

Contacts 60 seen in FIGS. 5 to 7 (as well as contacts 70 of FIG. 8) all preferably are round pins initially which have first contact sections 62 to be arrayed across the mounting face of connector 10, second contact sections 64 which form an array protected within hood central portion 22 of shell 20, and intermediate or body sections 66 therebetween. The medial portion of body section 66 of each contact preferably is formed by dies into an irregular cross-section such as a four-lobed star to create greater adhesion of the contact to the plastic of the septum following molding, as illustrated in FIG. 9.

Referring to FIGS. 6 and 7, first contact sections 62 have right angle bends for through-hole mounting to a circuit board, with the contacts in one of the rows of contacts being longer than those of the other to be received into a two-row array of through-holes to be soldered. Such right angle bends may be formed after completion of the molding of plastic septum 50, with the first contact sections 62 remaining straight during the insert molding procedure; the array of contacts 60 may be retained on a carrier strip during the molding process, if desired.

Metal shell 20 of connector 10 can be cast or impact extruded of aluminum and flange 34 then be machined thereinto, or the entire shell could be machined, if desired. Septum 50 can be made using thermoplastic resin such as for example polyester or polyphenylene sulfide. Contacts 60, 70 can be extruded for example of copper alloy such as brass which is nickel underplated and gold plated at the second contact sections and tin-lead plated at the first contact sections to enhance soldering.

Figure 10:
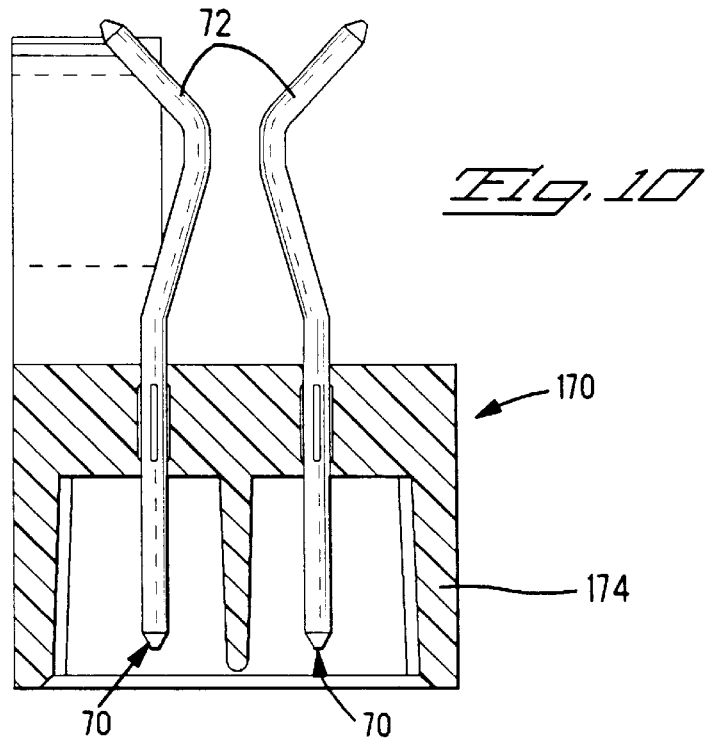
FIG. 10 is a cross-sectional view of an insert-molded all-plastic housing connector having contacts formed as shown in FIG. 8.
Figure 11:
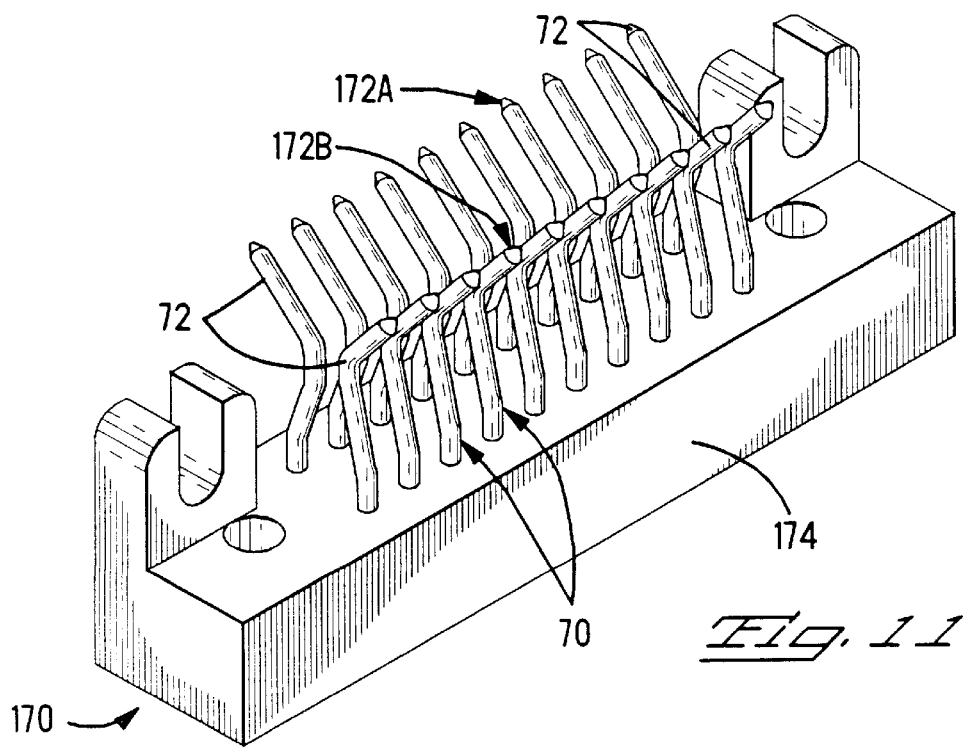
FIG. 11 is a perspective view of the connector of FIG. 10.

Referring now to FIGS. 10 and 11, connector 170 includes contacts 70 (FIG. 8) having first contact sections 72 which have been formed into generally arcuate shapes so that the contacts of opposing rows 172A, 172B can be oriented to have the arcuate first contact sections be convex toward each other (preferably with a short flat section at the bottom of the arc) for receipt therebetween of a card edge (not shown) and engage and be soldered to circuit termini along the card surface near the edge, termed straddle mounting.

Connector 170 is shown also as including an integrally molded plastic connector housing 174 within which the contacts have been insert molded, with the plastic housing molded to define a shroud or hood similar to hood 22 of FIGS. 4 and 5 surrounding the straight pin contact sections at ends opposite the arcuate first contact sections, and also to define mounting flanges similar to flanges 16 of FIG. 1. Connector 170 is in contrast with the metal shell-protected connector 10 of FIGS. 1 to 6, although the right angle-board mount connector could have an integral plastic housing, and the straddle-mount connector could have a metal shell, as desired.

Advantages of the method of the present invention include the connector itself being the fixture for holding the contacts during contact section forming en masse, and in a manner which holds the contacts firmly immobilized against rotation and other incremental movement relative to the housing and each other so that the resultant contact sections are formed precisely and assuredly, and in their ultimate position within the array appropriate for later board or card mounting; this greatly simplifies connector fabrication by obviating any need for contact-holding tooling otherwise needed to similarly immobilize the contacts during bending. The resultant connector is also sealed about the individual contacts without additional procedures. Insert molding is thus extended to connectors having nonstraight contact sections while retaining the advantage of contact-gripping tooling designed for straight contact connectors (such as pin headers) during molding.

The method of the present invention can easily be used beyond the specific connector embodiments which are illustrated in the drawings and described herein. The benefits of the particular disclosed connector embodiments being sealed occur at least during the soldering of first contact sections 62, 72 to circuit boards or cards respectively, which conventionally requires flux; the sealed nature of the connector prevents wicking of solder flux through the septum which could commonly ruin the connector.

Other electrical connectors could utilize the method of the present invention, such as utilizing contacts having square or rectangular cross-sections instead of round. Modifications can occur to the specific embodiment herein disclosed which are within the spirit of the invention and the scope of the claims.

What is claimed is:

1. A method of making an electrical connector comprising the steps of:

placing first linear round contact sections of electrical contacts in a stationary mold member with non-circular center sections and second linear round contact sections of the electrical contacts being exposed and extending into a cavity of the stationary mold member, the non-circular sections having a plurality of lobes extending beyond the periphery of the first and second round contacts sections;

moving a movable mold member into said cavity to a position adjacent the non-circular center sections so that a space is provided between the stationary mold member and the movable mold member and the second linear round contact sections are disposed in passageways in the movable mold member; and injecting plastic resin into the space forming a septum with the non-circular center sections being sealingly secured therein thereby forming a contact assembly, the non-circular sections preventing the electrical contacts from being rotated or axially moved relative to said septum.

2. A method as claimed in claim 1, and further comprising the steps of removing the contact assembly from the stationary and movable mold members, and bending the first contact sections at a substantially right angle with respect to the second contact sections.

3. A method as claimed in claim 1, and further comprising the steps of removing the contact assembly from the stationary and movable mold members, and bending the first contact sections into an arcuate shape.

4. A method as claimed in claim 1, wherein a metal shell having a septum region and a hood section is positioned in the cavity of said stationary mold member, and the plastic resin is injected into the septum region thereby forming the septum therein extending transverse to the metal shell so that the second contact sections are disposed within said hood section.

5. A method as claimed in claim 4, wherein the septum region includes a dove-tail shaped flange.

6. A method as claimed in claim 1, wherein said septum has an integral hood section within which the second contact sections are disposed.

7. A method of making an electrical connector comprising the steps of:

placing first linear round contact sections of electrical contacts in a stationary mold member with non-circular center sections and second linear round contact sections of the electrical contacts being exposed and extending into a cavity of the stationary mold member, a metal shell having a septum region and a hood section is positioned in the cavity of said stationary mold member;

moving a movable mold member into said cavity to a position adjacent the non-circular center sections so that a space is provided between the stationary mold member and the movable mold member and the second linear round contact sections are disposed in passageways in the movable mold member; and injecting plastic resin into the septum region forming a septum with the non-circular-center sections being sealingly secured therein, the septum extending traverse to the metal shell, thereby forming a contact assembly.

8. A method as claimed in claim 7, and further comprising the steps of removing the contact assembly from the stationary and movable mold members, and bending the first contact sections at a substantially right angle with respect to the second contact sections.

9. A method as claimed in claim 7, and further comprising the steps of removing the contact assembly from the stationary and movable mold members, and bending the first contact sections into an arcuate shape.

10. A method as claimed in claim 7, wherein the septum region includes a dove-tail shaped flange.

11. A method as claimed in claim 7, wherein said septum has an integral hood section within which the second contact sections are disposed.

12. A method as claimed in claim 7, wherein the non-circular sections of the electrical contacts have a plurality of lobes extending beyond the periphery of the first and second round contact sections thereby preventing the electrical contacts from being rotated or axially moved relative to said septum.

* * * * *